(12) United States Patent
Smyk

(10) Patent No.: US 6,289,001 B1
(45) Date of Patent: Sep. 11, 2001

(54) SYSTEM AND METHOD FOR ATM PROXY SIGNALING

(75) Inventor: Darek A. Smyk, Basking Ridge, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/419,168

(22) Filed: Oct. 15, 1999

Related U.S. Application Data

(60) Provisional application No. 60/104,384, filed on Oct. 15, 1998.

(51) Int. Cl.[7] .................................................... G01R 21/08
(52) U.S. Cl. ............................................ 370/216; 370/398
(58) Field of Search ................................ 370/216, 222, 370/385, 398, 399

(56) References Cited

U.S. PATENT DOCUMENTS

| | | | |
|---|---|---|---|
| 5,483,527 | 1/1996 | Doshi et al. ...................... | 370/60.1 |
| 5,592,466 | 1/1997 | Buczny et al. ..................... | 370/217 |
| 5,848,128 | * 12/1998 | Frey ................................. | 379/9 |
| 6,111,852 | * 8/2000 | Leung et al. ...................... | 370/217 |
| 6,205,557 | * 3/2001 | Chong et al. ..................... | 714/4 |

* cited by examiner

*Primary Examiner*—Douglas Olms
*Assistant Examiner*—Ken Vanderpuye
(74) *Attorney, Agent, or Firm*—Joseph Giordano

(57) ABSTRACT

Asynchronous transfer mode ("ATM") proxy signaling methods and apparatus provide ATM signaling reliability. A plurality of proxy agents are connected to a ATM switch. The ATM switch proxy agents are connected via SVCs established under the control of a proxy agent selector. The proxy agent selector identifies an alternative proxy agents should one or more of the other proxy agents fail. Upon failure of one or more proxy agents, under the control of timing operations within the controller of the switch, the proxy agent selector selects one or more alternative proxy agents. In this manner, proxy agent signaling continues to a ATM switch undisturbed.

2 Claims, 3 Drawing Sheets

SYSTEM AND METHOD FOR ATM PROXY SIGNALING

CROSS-REFERENCE TO RELATED APPLICATIONS

This application claims the benefit of U.S. Provisional Application No. 60/104,384, filed Oct. 15, 1998, the contents of which are hereby incorporated by reference.

BACKGROUND OF THE INVENTION

The present invention relates generally to packet based data communication networks, and more particularly to proxy agent control of asynchronous transfer mode (ATM) networks.

Today, telecommunications continues to shift from an emphasis on circuit switched networks, such as the Public Switched Telephone Network (PSTN) to faster, more flexible packet-based data networks. Internet protocol (IP) and ATM protocol technologies provide the processing bandwidth and speed necessary to communicate real time voice, data, and graphics between end users.

In a typical ATM network supporting voice communication, the ATM network is utilized for interconnecting trunking gateways linked to traditional circuit switched based PSTN networks and/or access gateways linked to telephone users access devices such as analog phones, PBXs, etc. For example, an end user may have a phone set connected to ATM access gateway. The ATM gateway interfaces with the user's phone set and translates the voice into data packets. The gateway then sends the packets to an ATM switch (or a network of ATM switches) for routing. On the other side of the ATM switch, a second access gateway interfaces with the receiving end user and translates the packetized data into a real time voice call for the user.

ATM switches route ATM data packets over virtual circuits. When Switched Virtual Circuits (SVC) are utilized by the ATM network the virtual circuits are established on demand in real time. Thus, for each call, a virtual circuit from the originating end user to a destination end user must be setup by the ATM switch(s). The intelligence for controlling the establishment of these virtual circuits can be included within the ATM switch or within a "proxy agent." A proxy agent is typically a separate network element connected to both the gateways and the ATM switch to provide the third party signaling necessary to setup and maintain a call connection. Proxy agents communicate with ATM switches and gateways by "proxy signals," which are received on one or more ports of an ATM switch. Each ATM switch port controls a set of communication circuits within the switch interior to establish virtual circuits to a called party. For example, an ATM switch may include four ports, each of which controls hundreds of communication circuits within the switch. ATM switches typically include a timer for taking down all virtual circuits when a proxy signal control fails. For example, the ATM Forum's UNI proxy signaling standard defines this timer as a configurable timer. (In this application, this timer is designated as T.) Thus, failure of proxy signaling between the proxy agent and an ATM switch port results in termination of many call connections. This, of course, results in reliability problems, a key concern for any network operator. Typically in case of proxy agent failure, control can be redelegated to another port and/or another proxy agent. However, the switch must be manually reconfigured to match the new port to the corresponding circuit connections. This, of course, takes time and reduces network availability.

Therefore, it is desirable to have methods and systems to overcome the disadvantages of proxy agent signaling in data networks, particularly ATM switch-based networks.

SUMMARY OF THE INVENTION

Accordingly, the present invention is directed to systems and methods for ATM proxy signaling that substantially obviate one or more of the problems due to limitations and disadvantages of the prior art.

In accordance with the purposes of the invention, as embodied and broadly described, the invention comprises a packet-based data network, including, a first switch for controlling connections between end users, and a plurality of proxy agents, each being capable of providing proxy signals to the first switch. One of the plurality of ATM proxy agents includes a proxy agent selector to select one or more proxy agents for providing proxy signals to the first ATM switch. The network also includes a second switch connected to the first switch, the second switch includes a controller to switch from a connection to one ATM proxy agent to a second ATM proxy agent selected by the proxy agent selector when the connection to one ATM proxy agent fails.

In another aspect, the invention comprises an ATM switch for connection to a plurality of proxy agents capable of providing proxy agent signals for another ATM switch, including, input and output ports, a switch fabric, and a controller for switching connections between the plurality of proxy agents in response to selection information.

In another aspect, the invention comprises a method of providing proxy signals from proxy agents to a data packet switch. The method comprises the steps of selecting one of the plurality of proxy agents to provide proxy signals, and switching connection from the one proxy agent to another of the plurality of proxy agents when the connection from the one proxy agent fails.

The above description of the invention and the following description for carrying out the best mode of the invention should not restrict the scope of the claimed invention. Both provide examples and explanations to enable others to practice the invention. The accompanying drawings, which form part of the description for carrying out the best mode of the invention and together with the description, explain the principles of the invention.

BEST MODE FOR CARRYING OUT THE INVENTION

Figure 1:
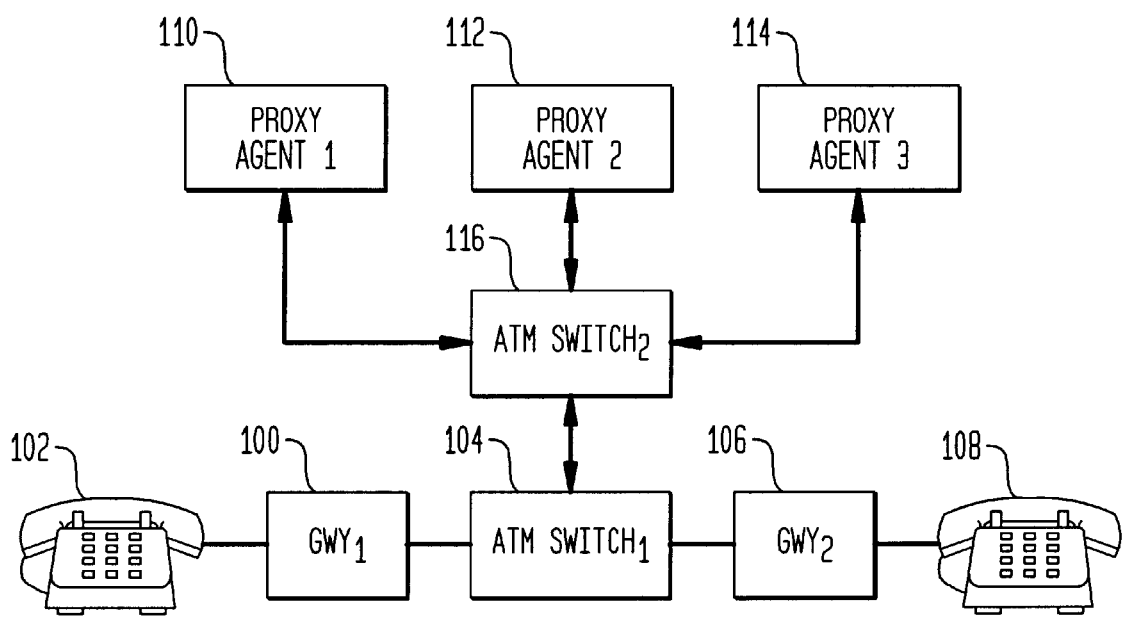
FIG. 1 is a block diagram of an ATM network, in accordance with one embodiment of the present invention.

FIG. 1 shows a block diagram of an ATM network in accordance with one embodiment of the present invention. A gateway ($GWY_1$) 100 connects one end user 102 to ATM switch 104. Gateway ($GWY_2$) 106 connects a second end user 108 to the ATM switch 104. Proxy agent 1 110, proxy agent 2 112, and proxy agent 3 114 are connected to ATM switch 2 116, which is connected to ATM switch 1 104. Proxy agent 1 110 and proxy agent 2 112 provide proxy control signaling to ATM switch 1 104 while proxy agent 3

114 provides proxy control signaling to ATM switch 2 116. In accordance with the invention, under control of proxy agent 3, the ATM switch 2 116 switches proxy signaling agent control of ATM switch 1 104 to one of proxy agents 1 and 2, respectively.

Figure 2:
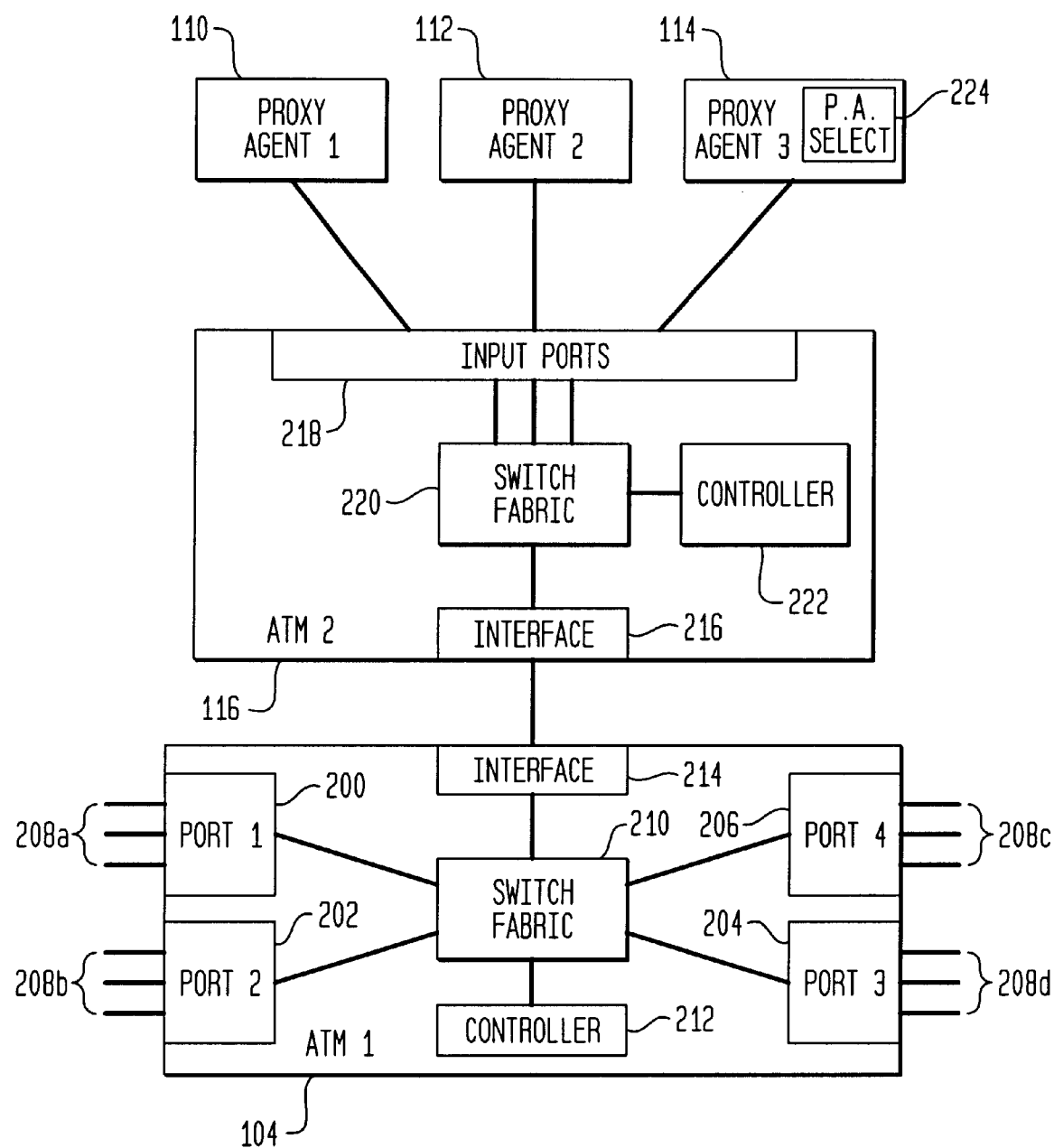
FIG. 2 is a more detailed block diagram of an ATM network, in accordance with one embodiment of the present invention.

FIG. 2 illustrates a more detailed block diagram of ATM switch 1 104, ATM switch 2 116, and the three proxy agents 110, 112, and 114, in accordance with one embodiment of the present invention. ATM switch 1 104 includes a plurality of input/output ports 200, 202, 204, and 206. Each port communicates with multiple physical circuit connections $208_a$ thru $208_d$. Switch fabric 210 within the ATM switch transfers data packets between the ports. Switch fabric 210 is controlled by a controller 212. ATM switch 1 104 communicates with ATM switch 2 116 through interface 214 in ATM switch 1 and interface 216 in ATM switch 2. ATM switch 2 also includes a plurality of input ports 218, a switch fabric 220, and a controller 222.

In a preferred embodiment, proxy agent 3 114 includes a proxy agent selector 224 to identify and keep track of which proxy agent (1 or 2) provides mapping instructions for the virtual circuit connections for ATM switch 1. For example, under normal operation, proxy agent selector 224 may be set to specify proxy agent 1 110 as the governing proxy agent for ATM switch 1. Alternatively, proxy agent selector 224 may establish that proxy agent 1 110 controls the mapping operations for any inputs received on port 1 200 and proxy agent 2 112 govern the mapping operations for any inputs received on port 2 202. Controller 212 includes an ATM standard clock function. As is conventional, if the currently selected proxy agent goes down or fails for some reason, after the expiration of the timer, controller 212 will shut down all virtual circuit connections being governed by that proxy agent.

In accordance with the invention, however, ATM switch 2 116 includes a controller 222 with several different timers and switching function control. In particular, controller 222 includes a timer which specifies how quickly ATM switch controllers (such as 222 and 212) notify a respective proxy agent that a switched virtual circuit established under its control had failed. This timer is designated in this application as timer $T_c$. Thus timer $T_c$ governs how quickly proxy agent 3 will be notified by switch controller 222 that a virtual circuit between the ATM switch 1 and its proxy agent failed. For example, proxy agent selector 224 may be programmed that if for any reason proxy agent 1 110 fails, ATM switch 2 should establish a virtual circuit to proxy agent 2 112 and ATM switch 1. The timer $T_c$ for this function is set to a time less than that of a timer $T_p$ in controller 212 to ensure that the ATM switch 1 never concludes that its proxy agent failed. For example, if the timer $T_c$ in controller 222 is set at one second, while the timer $T_p$ in controller 212 is set at five seconds, the virtual circuits will not be disconnected by controller 212 because controller 222 will switch from proxy agent 1 to proxy agent 2.

The invention also accounts for the condition where the proxy agent 3 114, which provides the proxy agent selector function, fails. If proxy agent 3 114 fails, ATM switch 2 116 cannot know when and how to switch the proxy agents 110 and 112. Accordingly, in a preferred embodiment, ATM switch 2 should simply maintain the status quo connections between the remaining proxy agents and ATM switch 1. Thus, in another embodiment, controller 222 includes a second timer $T_p$ set at a very high time period, for example several hours. When the communication connection between the proxy agent 3 114 and ATM switch 2 116 fails, controller 222 activates this second timer and maintains the connections between ATM switch 1 and either proxy agent 1 110, proxy agent 2 112, or both, for that predetermined time period.

Figure 3:
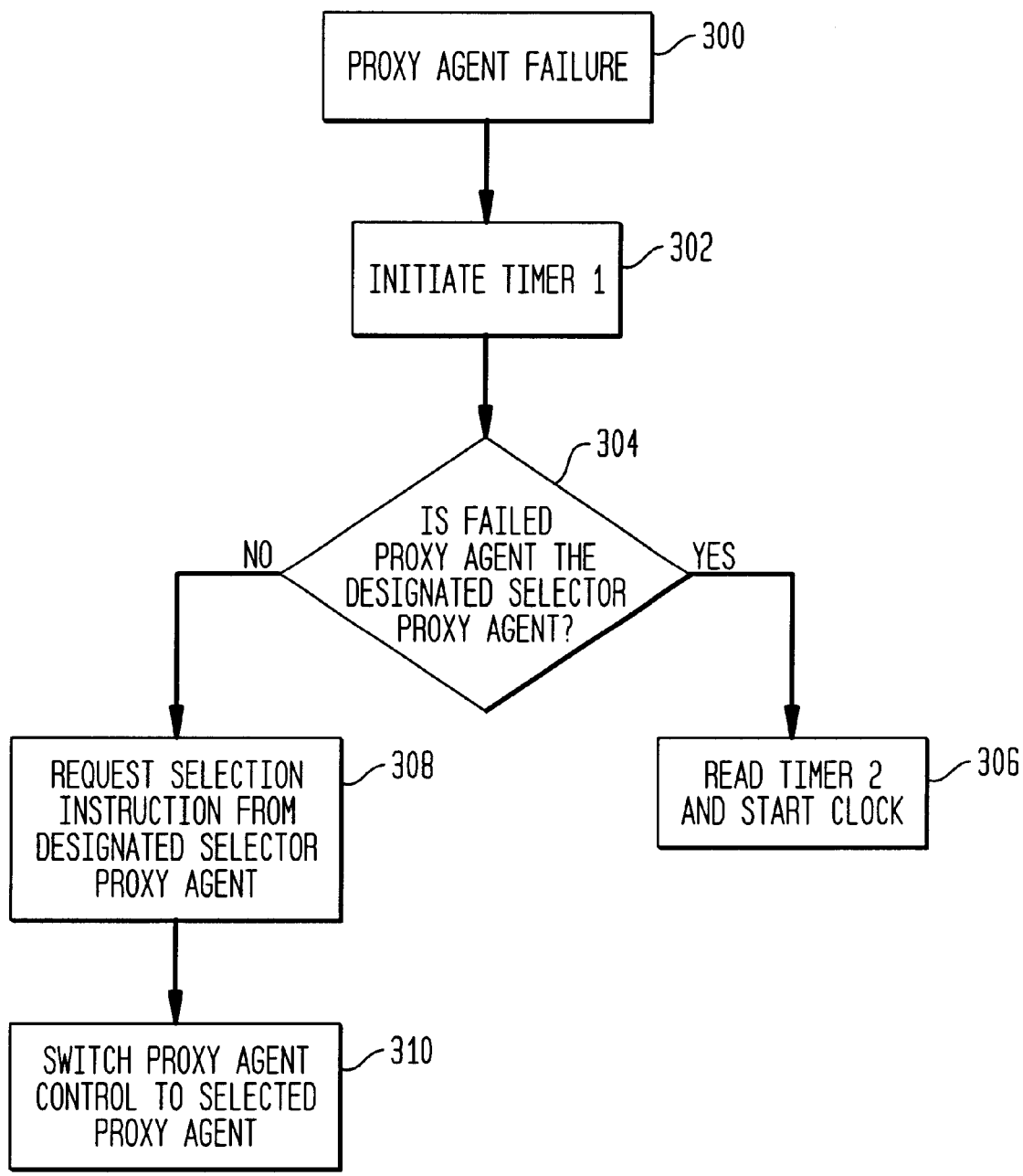
FIG. 3 is a process flow diagram of a process operation of an ATM switch, in accordance with one embodiment of the present invention.

FIG. 3 illustrates a process flow operation of ATM switch 2 116 in accordance with one embodiment of the present invention. When ATM switch 2 detects a proxy agent failure (step 300), it activates the first timer $T_c$ (step 302). The ATM switch 2 then determines whether the failed proxy agent is the designated selector proxy agent (step 304). If so, the processing operation reads the second timer $T_p$ (the long timer to retain the status quo) and starts a clock according to that time period (step 306). Again, this time period may be several hours, and is preferably long enough to allow system operations to manually or automatically get the designated selector proxy agent up and running again.

If the failed proxy agent is not the designated selector proxy agent, the ATM switch 2 notifies its proxy agent (agent 3) that the virtual circuit failed. If the failed virtual circuit was between ATM switch 1 and its circuit proxy agent (e.g., agent 1), then selector proxy agent (agent 3) establishes a virtual circuit between ATM switch 2 and the remaining proxy agent (e.g. agent 2). Again, these processing steps are preferably operated within a timer period shorter than the expiration time period set in ATM switch 1.

In accordance with the present invention, controllers 212 and 222 comprise processing circuits, and hardware or software timers and any software and/or hardware necessary to execute the described functionality. The proxy agent selector 224 also preferably comprises a processor programmed with the necessary software to provide the described functionality. However, other implementations are contemplated, in order to effect the described and claimed functionality of the present invention.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

For example, another preferred embodiment of the invention would include only one physical switch implementing the above described concepts of ATM switch 1 and 2 as logical partitions of the same, physical switch.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. An ATM network comprising:

a first switch for controlling connections between end users;

a plurality of proxy agents, each being capable of providing Proxy signals to said first switch, one of said plurality of ATM proxy agents including a proxy agent selector to select one or more proxy agents for providing proxy signals to said first ATM switch; and a second switch connected to said first switch, said second switch including a controller to switch from connection to one ATM proxy agent to a second ATM proxy agent selected by said proxy agent selector when said connection to said one ATM proxy agent fails, wherein said controller in said second switch includes means for maintaining any existing connections to one or more of said plurality of ATM proxy agents for a predetermined time period when a connection to an ATM proxy agent that includes an ATM proxy agent selector fails.

2. A method for providing proxy signals from a plurality of proxy agents to a data packet switch, one of said plurality of proxy agents including a proxy agent selector, said method comprising the steps of:

selecting one of said plurality of proxy agents to provide proxy signals to the data packet switch;

upon a failure of the connection to said selected one proxy agent, selecting a second proxy agent to provide proxy signals to the data packet switch; and maintaining any existing connections to one or more of said plurality of proxy agents for a predetermined period of time when the connection to a proxy agent that includes a proxy agent selector fails.

* * * * *